United States Patent [19]

Gil et al.

[11] Patent Number: 4,544,559

[45] Date of Patent: Oct. 1, 1985

[54] NUCLEOTIDE ENRICHED HUMANIZED MILK AND PROCESS FOR ITS PREPARATION

[75] Inventors: Angel Gil; Luis Valverde, both of Granada, Spain

[73] Assignee: Union Industrial y Agroganadera, S.A. (UNIASA), Granada, Spain

[21] Appl. No.: 441,758

[22] Filed: Nov. 15, 1982

[30] Foreign Application Priority Data

Nov. 16, 1981 [ES] Spain .................................. 507187

[51] Int. Cl.$^4$ ........................... A23C 9/00; A23L 1/30; B65B 55/14
[52] U.S. Cl. ......................................... 426/72; 426/73; 426/74; 426/580; 426/585; 426/658; 426/801; 426/399; 426/401
[58] Field of Search ............... 426/580, 583, 585, 658, 426/72, 74, 801, 73, 399, 401

[56] References Cited

U.S. PATENT DOCUMENTS

| | | | |
|---|---|---|---|
| 3,201,256 | 8/1965 | Clark et al. | 426/801 |
| 3,231,385 | 1/1966 | Ziro et al. | 426/580 |
| 3,901,979 | 8/1975 | Nagasawa et al. | 426/801 |
| 4,216,236 | 8/1980 | Müeller et al. | 426/590 |

OTHER PUBLICATIONS

A. E. Bender, *Dietetic Foods*, Chemical Publishing, N.Y., 1968, p. 219.

*Primary Examiner*—Raymond N. Jones
*Assistant Examiner*—Elizabeth C. Weimar
*Attorney, Agent, or Firm*—Fleit, Jacobson, Cohn & Price

[57] ABSTRACT

A nucleotide enriched humanized milk for infant nourishment, which is manufactured as a sterilized fluid or an instant powdered milk, both of which contain nucleotides AMP, CMP, GMP, IMP and UMP at concentrations similar to those found in human milk. The remaining components of this humanized milk comply with the standards of EPSGAN and AAP. The concentrations of nucleotides referred to in powdered milk are: 1.12 mg/100 g of CMP; 1.32 mg/100 g of AMP; 1.49 mg/100 g of GMP; 3.42 mg/100 g of UMP and 0.45 mg/100 g of IMP. The nucleotidic composition of fluid milk is: 0.15 mg/100 ml of CMP; 0.17 mg/100 ml of AMP; 0.19 mg/100 ml of GMP; 0.44 mg/100 ml of UMP and 0.06 mg/100 ml of IMP. The raw materials used in the manufacture of this humanized milk, cow's milk, demineralized whey, lactose, vitamins and minerals, are mixed and pasteurized. The nucleotides are added afterwards and the new mix is UHT-sterilized or spray-dried.

7 Claims, 4 Drawing Figures

NUCLEOTIDE ENRICHED HUMANIZED MILK AND PROCESS FOR ITS PREPARATION

BACKGROUND OF THE INVENTION

Human milk is an irreplaceable food for the newborn. However, on many occasions, due to illness of the mother, bad quality of milk secretion, or even due to specific social and/or economic factors, the newborns are to fed with milk formulas which try to be similar, both in qualitative and quantitative aspects, to human milk.

The European Paediatrics Society for Gastroenterology and Nutrition, EPSGAN, issued in 1978 some rules that humanized milk formulas for the feeding of infants must comply with. In the same way, in 1976 the American Academy of Paediatrics, AAP, published the standards for the formulation of baby foods as substitutes of human milk.

These standards state the maximum and minimum content in proteins, lipids, glucides, mineral salts and vitamins of a humanized milk formula, for the feeding of healthy infants. Likewise the EPSGAN prescribed that this kind of artificial milk, produced mainly with cow's milk and milk by-products, must keep a casein/lactalbumin ratio of about 40:60, which is similar to the one found in human milk. They also must have a fatty acid pattern most resembling, both in qualitative and quantitative aspects, the one found in human milk.

Despite all the scientific efforts carried out, until now it has been impossible to find a product which has the same composition of human milk. This is due mainly to the presence of specific microcomponents in human milk which even can be different according to each person. An example of these components are the immunoglobulins of secretory character which give to the milk of each mother specific antibodies against many illnesses. These antibodies protect the infant during the first months of his life against those same illnesses that the mother has undergone.

Among the microcomponents of milk there are other substances which have an unknown structure and physiology.

Nucleotides are fundamental substances for life, as they are structural units of the nucleic acids, which are the responsible compounds of the individual genetical load. Even when nucleotides take part in many biochemical reactions, their function in milk remains unknown. There are few studies carried out to find out the nucleotidic composition of milk from different species, being limited to the chromatographic analysis of some individual samples, which does not allow any conculsions to be drawn without a risk of error.

Before going further, it will be convenient to set up some equivalences between terms used in this description. Accordingly, "humanized milk" will be understood as a milk artificially treated ("adapted milk") to become similar to human milk; "breast milk" will be equivalent to "human milk".

Regarding the identification of the different kinds of nucleotides, it will be used, as it is extended in practice, the abbreviated name formed by the respective initials.

AMP=Adenosine-monophosphate
CMP=Cytidine-monophosphate
GMP=Guanosine-monophosphate
IMP=Inosine-monophosphate
UMP=Uridine-monophosphate
ADP=Adenosine-diphosphate
CDP=Cytidine-diphosphate
UDP=Uridine-diphosphate
ATP=Adenosine-triphosphate
UTP=Uridine-triphosphate
NAD=Nictine-adenin-dinucleotide
UDPG=Uridine-diphosphate-glucose
UDPGa=Uridine-diphosphate-galactose
UDP-N-AG=Uridine-diphosphate-N-acetyl-glucosamine
UDP-N-AGa=Uridine-diphosphate-N-acetyl-galactosamine
GDPMan=Guanosine-diphosphate-mannose
GDPFuc=Guanosine-diphosphate-fucose

DESCRIPTION OF PRIOR ART

The qualitative and quantitative differences between human milk and milk secreted by other animal species are subject to constant investigation in their biochemical, microbiological, inmunological and bromatological aspects. At every moment, these differences are evaluated from a pediatric point of view and therefore, the industry has understood the need of a closer adaptation between humanized milk, usually elaborated with cow's milk, and human milk.

One of the most poorly known aspects of milk biochemistry is its nucleotidic composition, in spite of the fact that these biomolecules are essential as well in the intermediary metabolism as in the energy transference reactions.

Studies carried out to elucidate the nucleotidic composition of milk of several species, including the human milk, have been confined to the chromatographic analysis of a few samples, which make difficult their evaluation and has a risk of error.

The first study on the nucleotidic constituents of the mammary gland are dated in 1952, when Rutter and Hansen (W. J. Rutter and R. G. Hansen, J. Biol. Chem. 202,323,1953) demonstrated the presence of UDPG in mammary gland of rats. In 1956, W. Manson (W. Manson, Biochim. Biophys. Acta 19,398,1956) investigated the nucleotides present in mammary glands of cows and goats during the lactation period, proving that there were no qualitative differences between these two species but that they widely differed on the quantitative aspect. Such differences were probably due to the fact that the tissular extracts were obtained at different stages of lactation. Apart from AMP, CMP, GMP, IMP, NAD, CDP, ADP, UDP, ATP and UTP, UDP-N-AG and UDPG were identified in high concentrations (15–40 $\mu$mol/100 g of tissue). However, orotic acid was found only as traces.

Although the different analytical methods used and the lack of samples did not allow the application of statistical analysis, all these authors concluded that the nucleotidic composition of the mammary gland depends on its physiological states, gestation/lactation, and that the most abundant nucleotides during lactation are adenine, guanosine and inosine derivates, while during gestation uridine derivates were the most abundant (61% of total nucleotidic fraction). The NAD+ content of mammary gland becomes multiplied by four during the secretory stage, which is in agreement with the results obtained by McLean (P. McLean, Biochim. Biophys Acta 30, 316,1958) on the mammary gland of rat. It seems that UDPGa is accumulated before birth, lowering throughout the lactation period. On the other hand, the UDP-N-acetyl-hexosamines become particularly abundant just before birth. Through the few papers on the nucleotidic composition of mammary gland and milk of several species, it might be assumed that the content of acid-soluble nucleotides of mammary gland is different from the secreted milk, both from the qualitative and quantitative point of view.

The orotic acid was first discovered in 1904 and since then it has been assumed to be a typical constituent of ruminant's milk. However, the values stated in literature are widely disperse, perhaps as a consequence of the different microbiological and chemical methods of analysis, which have been rather non-specific. Nevertheless, the most general and current opinion is that only bovine's milk contains high amounts of orotic acid (up to 6 mg/100 ml) in contrast to ovine's milk (0.8-1 mg/100 ml) and human milk in which it is virtually absent.

Values of orotic acid found in the mammary gland cells of cows are similar to those of any other animal tissues and organs, which leads one to think that the high amount of orotate is peculiar to bovine's milk. The presence of a high orotic acid concentration in cow's milk is of great interest since milk formulas for newborns are based on the utilization of cow's milk and some of its derivatives, and it has been shown that concentrations of 1% of orotic acid in the diet induce fatty livers (J. L. Robinson, J. of Dairy Sci. 63,865,1980). The physiological roles of orotic acid and nucleotides in milk of different species remain, up to now, unknown.

The application of quantitative methods to the bacteriological study of faecal material has completely changed the first ideas on the composition of normal intestine microflora. These ideas were based on mere qualitative results obtained through aerobic cultures of faeces. The prevailing character of *Escherichia coli* in faeces of man and several animal species were generally accepted. There was an only exception applied to bacterial content of faeces of healthy breast-fed infants, in which *Bifidobacterium bifidum* Ti., discovered by Tissier, was predominant and almost exclusive.

The investigations conducted by Werner and Seeliger (H. Werner and H. P. R. Seeliger, Ann. Inst. Pasteur 103,911,1963) and Spaulding et al. (E. H. Spaulding et al., J. Bact. 83,968,1962) have altered the ideas on the composition of intestinal microflora. Anaerobic bacteria represent 90-95% of culturable flora of adults. The percentage of *E. coli* as well as of enterococci varies from 1-5% and lactobacilli do not exceed 6% of total bacterial count. Other groups and species, such as sporulated aerobic bacilli, staphylococci and *Pseudomonas* spp., are not commonly present and are not important numerically.

The bulk of anaerobic bacteria in human intestine consists of non-sporulated Gram positive bacilli and Gram negative bacilli. These latter make up an heterogeneous group of proteolytic and saccharoclastic bacteria belonging to Gen. Bacteroides which according to culture conditions, may reach 40-80% of total culturable bacteria in adults. In the same way, Gram positive non-sporulated bacteria may reach 10-60% in normal adults.

Contrary to adults, faeces from exclusively breast-fed infants are characterized by the absolute preponderance of Gram positive anaerobic bacilli. Gram negative anaerobic bacteria being commonly absent.

Before the final classification of Gen. Bifidobacterium in 1974, a strong controversy arose since many authors considered bifidobacteria as belonging to Gen. Lactobacillus, particularly to species *L. bifidus*.

The knowledge of bifidobacteria was considerably improved by the work of Dehnert (J. Dehnert, Zentbl. Bakt. Parasitenk, Abt. I. Origi., 169,66,1957) who brought the first practial scheme to differentiate groups and biochemical types basing the differential diagnosis mainly on carbohydrate fermentation.

In 1963, Reuter (G. Reuter, Zentbl. Bakt. Parasitenk., Abt. I. Orig., 191,486,1963) named *B. adolescentis, B. longum, B. breve, B. parvulorum, B. infantis, B. liberorum* and *B. lactentis* a series of micro-organisms which previously had been deemed as biotypes of *B. bifidum*.

The studies, mainly performed by Werner and Seeliger (opus cit.) show that most of the anaerobic Gram positive bacteria from faeces are included in the Gen. Bifidobacterium. Eventually, it is also possible to find corynebacteria but these are not constant nor lasting and when they are present, their number does not exceed $10^4$/g of faeces.

The number of bifidobacteria in relation to total bacterial count and the distribution of its species or biochemical types depend on the age and on the feeding. In faeces of infants exclusively fed with human milk, bifidobacteria ranged $10^9$-$10^{11}$/g and this number was higher than any other present species, mainly *E. coli*. In faeces of infants fed with artificial milk formulas, it is possible to find bifidobacteria in a similar concentration, but the proportion of Gram negative aerobia and anaerobia, besides enterococci, increases up to equalize the number of bifidobacteria. In faeces of adults, bifidobacteria are still present but among an increasing number of species of which Gram negative bacteria are the most important. This corroborates the Orla-Jensen and Haenel (S. Orla-Jensen et al., Senility and intestinal flora, K. Danske Vidensk. Selssk. Biol. Skrift. III,44, 1945) (H. Haenel, Zentbl, Bakt. Parasitenk., Abt. I. Orig., 170,323, 1957) hypothesis that the growth of several bacterial biotypes does not lead bifidobacteria to disappear in the adult microflora.

Bifidobacteria in infants fed with breast milk differ from the species present in infants fed with adapted milk formulas and in adults. The most prepondering biochemical strains in the German (FRG) breast milk fed infants is *B. infantis* (Groups III and IV, Dehnert opus cit.), but it is also possible to isolate *B. bifidum* (Groups I and II, Dehnert). Bifidobacteria in faeces of infants fed with a mixed lactation, based on human milk and artificial formulas, do not differ from those infants fed exclusively with human milk (F. Petuley et al., Zentbl. Bakt. Parasitenk., Abt. I. Origi., 195,347,1965).

Bifidobacteria have complex nutritional requirements. Their growth depends on carbohydrates and on organic nitrogen. On the other hand, carbonic anhydride is essential to promote bifidobacteria growth. These bacteria are stric anaerobia and they quickly die in aerobic subcultures. Bifidobacteria acidifies milk, leading to its coagulation when cystein is added.

According to Gyllenberg (H. J. Gyllenberg et al., J. Gen. Microb., 21,371,1959), the basic bifidobacteria growth factors depend on the species considered, the group IV (Dehnert) needs cystein, biotin and pantothenic acid to grow; groups III and V need cystein, pantethine and riboflavin, and group I may need these same factors together with aminosugars, mainly during isolation. Some strains of *B. bifidum* have been described, which growth depends on polyunsaturated fatty acid, deoxyribosides and $B_{12}$ vitamin, together with the usual bifidobacteria growth factors.

On the other hand, the quality and quantity of sugars in the intestine may affect these types and number of bifidobacteria in infants fed with human milk or with artificial milk formulas.

György et al. (P. György, Paediatrics, 11,98,1951 and P. György et al., Arch. Biochem. and Biophys., 48,193,1954) isolated a *B. bifidum* strain called variety *Pennsylvanicus* from infant faeces and from vaginal secretion of pregnant women. This strain required human milk to support its growth, but said dependence reverted with the course of time. This growth factor, present in human milk 50 times more concentrated that in cow's milk, has been identified as N-acetyl-lactosamine, although there are a great number of compounds derived from N-acetyl-glucosamine which are active to promote the growth of *B. bifidum* var. *Pennsylvanicus*. The unit of this bifidobacterium growth was defined by György et al. (opus cit.) as the equivalent to 0.06 ml of human milk (5–6 mg of total milk solids). However, this unit cannot be maintained because, as Cabezas et al. (J. A. Cabezas,) A. Carrión and J. Vázquez-Porto, Rev. Esp. de Fisiol., 24,2,85,1968) have demonstrated, the sialic acids content in colostrum and human milk strongly varied with lactation time.

Now regarding the industrial application of all these knowledges, the following patents have been brought into consideration:

U.S. Pat. No. 3,274,003 defines the incorporation to infant milk formulas of chemical compounds which exhibit promoting growth activity for *Lactobacillus bifidum* var. *Penn*. These substances are glucosamine derivates (N-octanoyl, N-benzoyl or N-carboxyethoxy-d-glucosamine).

U.S. Pat. No. 3,231,385, defines that when nucleotides present in human milk are added to cow's milk, they promote better taste and flavour, reducing its curd tension, allowing a better digestibility. With these aims, the applicants of that patent made an infant milk formula which contains sucrose and soluble polysaccharides, together with nucleotides.

U.S. Pat. No. 3,338,719, states that if cow's milk is treated with cristaline muramidase ranging 0.05–0.1 mg of enzyme/ml of milk at 30° C. during 3 h of reaction time, the final product promotes the growth of *Lactobacillus bifidum* equalizing the human milk effect.

Broadly, related patents are in agreement with the ability of several chemical compounds derived from glucosamine, or several enzymes, i.e. muramidase, to promote growth of *Bifidobacterium bifidum* var. *Pennsylvanicus*, as well as the use of nucleotides to enhance flavour, taste and digestibility of baby foods.

The present invention aims the composition and process to obtain a humanized milk added with nucleotides for infant feeding, the purpose of which is to promote the growth at intestinal level of infants, not of the strain *B. bifidum* var. *Penn*. but of the *B. bifidum Ti.*, bacteria which as has been aforementioned reach 80% of total bifidobacteria in faeces of breast-fed infants.

On the other hand, the proposed humanized milk promotes in the infants fed with it, a serum fatty acid pattern resembling that of infants fed with human milk.

DETAILED DESCRIPTION OF THE INVENTION

For a long time the applicants have studied the differences in the acid-soluble nucleotides content between human milk and milk from ruminant species, specially from the cow. For this purpose new analytic methods based on enzymatic determination of AMP, CMP, GMP, IMP, UMP and also adenine, cytidine, guanosine and uridine total nucleotides have been used, as well as traditional techniques for the determination of acid-soluble nucleotides by ion-exchange chromatography.

As a result of this investigation, the following conclusions have been reached:

Nucleotidic content of colostrum is very wide and it is quantitatively similar in all the kinds of milk studied. Something similar happens with milk, except with cow's milk. In this one, the orotate is accumulated in high amounts and the number of nucleotides is much lower.

The evolution of the nucleotidic composition of cow's, goat's and sheep's milk during lactation, is characterized by a quick increase of the concentration of nucleotides from birth until 48–120 h. later. Once the maximum is reached, it gradually begins to decrease. This decline takes between 15–30 days and this period is different for each species. On the other hand, nucleotidic content in human milk is constant during lactation.

In cow's milk, uridine derivatives are particularly abundant and sometimes they reach 85–90% of the total nucleotides during 24–48 h. after birth. UDP-N-AG, UDP-N-AGa, UDPG and UDPGa are the uridine nucleotides found in higher quantity. As just pointed out, the concentration of all the nucleotidic components in cow's milk, except the orotate, increase in a strong manner from parturition until 48 h. later. Subsequently CMP and AMP decrease gradually until the end of lactation and the uridine nucleotides content decrease very quickly until disappearing after one month of lactation. Guanine derivatives in cow's milk are not quantitatively important, and their evolution during lactation is quite similar to the uridine derivatives. The content in orotate during lactation reaches the 90% of the total of all nucleotides.

Sheep's milk has a great amount of nucleotides, being their concentration of about 5–7 times higher than in cows milk. Uridine derivates, mainly those bound to carbohydrates, such as glucose, galactose, N-acetylglucosamine, N-acetyl-galactosamine and glucoronic acid, are the predominant ones. On the other hand, there is a high content of guanine derivates of which GDPMan and GDPFuc are the most important ones. CMP and AMP are regularly found in sheep's milk reaching approximately 4 times the concentration found in cow's milk. The concentration of all the nucleotides in sheep's milk increases very quickly, from parturition until 48 h. later. Afterwards, the content in nucleotides decreases until it remains more or less unchanged at about the 15th–30th day of lactation.

In goat's milk the number of total nucleotides is 2–3 times higher than in cows milk, and more or less the half of that in sheep's milk during similar periods of lactation. Guanine nucleotides are quite abundant during this period and their concentration is very similar to the one found in sheep's milk. Among cytosine and adenine derivatives. CMP and AMP are the most abundant nucleotides during all the period of lactation. Orotate is also present in goat's milk but its proportion is 3 times smaller than in cow's milk and, on the other hand, its concentration does not change so suddenly during lactation period.

Human milk has a nucleotidic composition qualitatively similar to cow colostrum and to sheep's and goat's milk, although it is quite different to cow's milk. As to the quantitative aspects, there are sizable differences with sheep's and goat's milk since the content of nucleotides is only 20 μmol/100 ml. Uridine derivates (UMP, UDP-N-AG, UDP-N-AGa, UDPG and UDP) represent the biggest part of all the nucleotides present in human milk. Guanine derivates are usually in this milk although their concentration is rather low. The presence of GDPFuc could not be proved, although it is a common nucleotide in sheep's and goat's milk. On the other hand, GMP is a typical compound of human milk throughout the period of lactation. Cytidine and adenosine derivatives in human milk represent about 25% of the total nucleotides. So, these compounds are relatively much more abundant than in the milk of other species analysed in this description. It has to be noted that human milk is quite different from cow's, sheep's and goat's milk in view of the fact that no orotate could be measured in human milk.

The comparative statistical analysis of the results obtained on the nucleotidic composition of milk from different species and at different periods of lactation, has proved that the differences found in each source of variation are not due to hazard factors, being indeed quite significant, which nullifies all kind of generalizations often made about the discoveries carried out on a single species, as it happened with the orotate.

Another fundamental aspect for the newborn and the infant is the maintenance of his digestive physiology. In this way, feeding with human milk allows bifidobacteria to prevail in the infant intestine microflora. This prevailing microflora impedes the development of pathogenic bacteria as $E.\ coli$ and Salmonella. A consequence of artificial feeding is the decrease of bifidobacteria in the intestine of infants which can cause some gastrointestinal diseases.

Another conclusion of this investigation is that when adding the nucleotides which are present in human milk, in appropriate concentrations to cow's milk, these nucleotides speed up the growth of bifidobacteria.

Most of the international researches carried out in order to determine the stimulating substances of the growth of bifidobacteria, as it has been stated in the description of prior art, only enclosed the use of $Bifidobacterium\ bifidum$ ($B.\ bifidum$) var. $Pennsylvanicus$, which has lost its capacity to synthetize glucosamine. The results has been frequently generalized to the rest of the species of $Gen.\ Bifidobacterium$. However, in the last decade it has been proved that the presence of this bifidobacteria in faeces of infants fed with human milk, with mixed or with artificial feeding, represents only 15% of total bifidobacteria isolated from faeces of infants.

Studies carried out by the applicants have proved that "in vitro" the species $B.\ bifidum\ Ti.$ represents up to 80% of the $B.\ bifidum$ strains isolated from faeces of breast-fed infants. Their growth is significantly stimulated when adding to a growth medium based on cow's milk a mixture of monophosphate nucleotides, AMP, CMP, GMP, IMP and UMP, i.e. in the proportions mentioned in table V below.

The separate addition of AMP, CMP, GMP, IMP or UMP also stimulates the growth "in vitro" of $B.\ bifidum\ Ti.$, but not as much as when all these nucleotides are simultaneously present in the growth medium.

The addition of all possible combinations of two, three or four of the aforementioned nucleotides, stimulates in the same way the growth of $B.\ bifidum\ Ti.$, but the maximum stimulation is achieved when AMP, CMP, GMP, UMP and IMP are simultaneously present in molar ratios 1:1:1:3:0,5 respectively.

Other nucleotides in human milk such as UDPG, UDPGa, UDP-N-AG and UDP-N-AGa do not stimulate the growth "in vitro" of $B.\ bifidum\ Ti.$ if monophosphate nucleotides derivatives of adenine, cytosine, guanine, uracile and inosine are previously added to the growth medium.

In clinical researches performed by the company of applicants, it has been confirmed that in faeces from newborns who have been fed with the product of invention, the level of bifidobacteria is significantly increased in relation to the one found in the faeces of infants fed with any humanized milk which does not contain nucleotides in its formula.

The concentration and the species of bifidobacteria diagnosed in faeces from newborns fed with human milk and humanized milk to which nucloetides have been added, are quite similar, while in the case of infants fed with any humanized milk without nucleotides, both absolute number and diagnosed species of bifidobacteria are appreciably different.

In infants fed with human milk and humanized milk with nucleotides, the predominant species of bifidobacteria are $B.\ adolescentis$ and $B.\ bifidum$, as well as $B.\ breve$ in a relative high proportion. There are also other species ($B.\ infantis$, $B.\ liberorum$, $B.\ lactentis$ and $B.\ asteroides$) in scarce proportion.

In faeces from newborns fed with any humanized milk without nucleotides, even when there are also some species of the bifidobacteria just mentioned, the predominant species is $B.\ infantis$.

Researches carried out by the company of applicants proved consequently that specific nucleotides present in human milk added to artificial formulas in appropriate concentrations stimulate the growth of bifidobacteria in the intestine of the newborn, until it reaches a similar level to the one developed by breast-fed infants.

Another beneficial physiological consequence, when using humanized milk added with nucleotides, is the establishment of a serum fatty acids pattern in the newborn similar to the one observed in breast-fed infants.

As a result, serum levels of saturated fatty acids (palmitate, palmitoleate and oleate) have a significant and gradual decrease at 7 days and 30 days after the baby is born and milk diet has been started. It does not make any difference whether it is human or humanized milk. The decrease of these fatty acids is quantitatively lower in infants who have been fed with human milk or with humanized milk added with nucleotides.

Referring to unsaturated serum fatty acids, the level of plasma linoleate shows a significant increase after the diet has been started, but this increase is higher in infants fed with any humanized milk without nucleotides. On the other hand, serum levels of arachidonic acid remain unchanged in infants fed with human milk or humanized milk added with nucleotides, and decreases in those fed with any humanized milk without nucleotides. Furthermore, the arachidonic/linoleic and trienoic/tetraenoic acids ratios are significantly increased and decreased respectively, in infants fed with human milk and humanized milk added with nucleotides.

So these results suggest an important physiological role for the nucleotides present in human milk. These nucleotides take an important influence in the lipidic composition related to serum fatty acids and, as a consequence, in the structure and permeability of the cellular membrane.

From all this data it has been designed the composition and process to obtain a humanized milk which, besides to meet the EPSGAN and AAP standards, contains specific nucleotides that are qualitatively and quantitatively the same as in human milk.

The objectives of the product of invention (humanized milk) are in full agreement with the results obtained in infants fed with it, and can be enumerated as follows:

Closer equalization to human milk,

Better regulation of intestine microflora of infants, and

Determination of a serum fatty acids pattern similar to the one found in breast-fed infants.

The humanized milk composition of the present invention, as a result of a process which also forms part of it, can be produced or presented in two different ways: as an instant powder product or as a fluid one. The latter is conventionally sterilized and bottled, or it is sterilized at ultra-high-temperature (UHT) and packed aseptically.

For a better understanding of the composition and the process there will be listed the raw materials used together with their conditioning or modification where appropriate:

Cow's milk with 3.1% of fat and 8.2% of non-fat solids, free of antibiotics and any other substance foreign to milk.

Demineralized whey with 65% of proteins, obtained by electrodialysis.

A mixture of vegetable oils, constituted by 30% of medium chain triglycerides (MCT), obtained from coconut oil refining, 19% of the oleic fraction of palm oil, 26% of corn oil and 25% of soybean oil.

Lactose (pharmaceutical quality).

Dipotassium phosphate.

Tripotassium citrate.

Sodium ascorbate.

Vitamins.

Nucleotides (AMP, CMP, GMP, IMP and UMP).

Minerals (Fe, Mn, Cu, I)

Cow's milk, which is the principal raw material of humanized milks, will be modified by the addition of demineralized whey, vegetable oils, lactose, vitamins, minerals and nucleotides, in order to increase its biological value and digestibility, and also to make it suitable to the special requirements of the infant.

Added nucleotides enable the establishment of an intestinal microflora and a serum fatty acids pattern similar to those found in breast-fed infants. According to EPSGAN and AAP standards, casein/lactalbumin ratio will be adjusted by the addition of whey until it is similar to that of human milk (40:60). The protein load of the humanized milk added with nucleotides is 2.3 g/100 calories.

When comparing human milk fat and cow's milk fat, the first one has two fundamental advantages:

higher degree of absorption, and higher content in essential fatty acids (EFA).

Consequently, cow's milk fat must be modified when used to nourish infants by increasing its degree of absorption and its EFA content.

According to these criteria, milk fat in the humanized milk added with nucleotides of invention, has been modified by adding a mixture of vegetable oils, mainly medium chain triglycerides (MCT), palm, corn and soybean oils.

The presence of MCT together with concentrations of stearic and palmitic acids, lower than 10 and 20% respectively, gives to the humanized milk of invention a high degree of absorption. Moreover, the addition of corn and soybean oils, rich in polyunsaturated fatty acids, gives to the product a high biological value, since it is enriched with EFA, of vital importance in the development of the infants.

Fat content in the humanized milk added with nucleotides of the invention is 5.5 g/100 calories, and content in linoleic acid is 1.32 g/100 calories. Carbohydrates content is approximately 7 g/100 ml, being lactose its principal compound, in accordance with EPSGAN standards. The mineral content is similar to that of human milk, with a $K^+/Na^+$ ratio equal to 3, and a Ca/P ratio equal to 1.9.

The presence of nucleotides is considered as a fundamental character of the product of the invention for the special reasons aformentioned. Vitamin content will fit the characteristics that will ensure to infants the daily minimum intake of each vitamin. Likewise, mineral content will ensure an appropriate ingestion of oligoelements which are required for the normal development and growth of infants.

The following Tables show the typical composition of the humanized milk added with nucleotides according to the invention:

TABLE I

| | |
|---|---|
| Moisture | 2.5% |
| Proteins | 12.2% |
| Lipids | 29.5% |
| Carbohydrates | 53.7% |
| Mineral salts | 2.1% |
| Caloric content | 530 Kcal |

TABLE II

| Fatty acid content - g/100 g of fat | |
|---|---|
| Butyric | 0.6% |
| Caproic | 0.5% |
| Caprylic | 11.2% |
| Capric | 7.6% |
| Lauric | 1.1% |
| Myristic | 3.0% |
| Palmitic | 19.0% |
| Stearic | 5.6% |
| Palmitoleic | 0.7% |
| Oleic | 24.2% |
| Linolenic | 1.9% |
| Linoleic | 24.0% |
| Arachidonic | 0.6% |

TABLE III

| Mineral content per 100 g of dry product | |
|---|---|
| Ca | 370 mg |
| P | 190 mg |
| Na | 175 mg |
| K | 495 mg |
| Cl | 330 mg |
| Mg | 55 mg |
| Fe | 6 mg |
| Zn | 1.5 mg |
| Cu | 0.3 mg |
| Mn | 0.006 mg |
| I | 0.03 mg |

TABLE IV

| Vitamins per 100 g of product | |
|---|---|
| A | 1.600 U.I. |
| $D_3$ | 300 U.I. |
| $B_1$ | 0.40 mg |
| $B_2$ | 0.45 mg |

TABLE IV-continued

| Vitamins per 100 g of product | |
|---|---|
| $B_6$ | 0.20 mg |
| $B_{12}$ | 1.1 μg |
| C | 40 mg |
| E | 5 mg |
| Folic acid | 45 μg |
| Calcium panthotenate | 5.5 mg |
| Nicotinamide | 6.7 mg |
| Biotin | 15 μg |
| $K_1$ | 60 μg |

TABLE V

| Nucleotides per 100 g of product | | |
|---|---|---|
| Uridine-5'-monophosphate disodium salt | UMP | 3.42 mg |
| Guanosine-5'-monophosphate disodium salt | GMP | 1.49 mg |
| Adenosine-5'-monophosphate disodium salt | AMP | 1.32 mg |
| Cytidine-5'-monophosphate disodium salt | CMP | 1.12 mg |
| Inosine-5'-monophosphate disodium salt | IMP | 0.45 mg |

The composition of the liquid product is the same as the powdered one, taking into account that the first one is a liquid which has 13% of the solids corresponding to the powdered product. For example, UMP corresponds to 3.42 mg/100 g of dry product which multiplied by 130 g of dry product present in 1 liter of liquid milk is equal to 4.4 mg/liter of UMP. Similar operation with the other, nucleotides results in 1.9 mg/liter of GMP, 1.7 mg/liter of AMP, 1.5 mg/liter of CMP and 0.6 mg/liter of IMP.

The preparation process for the powdered form has two well differentiated stages. A first one in which a base of the powdered product is obtained, and a second one in which said base is mixed up with vitamins and a further portion of lactose. The product is granulated and made instant before packing.

The above-mentioned base for the powdered product is obtained from a liquid product having 11% of total solids by dissolution of the components.

Figure 1:
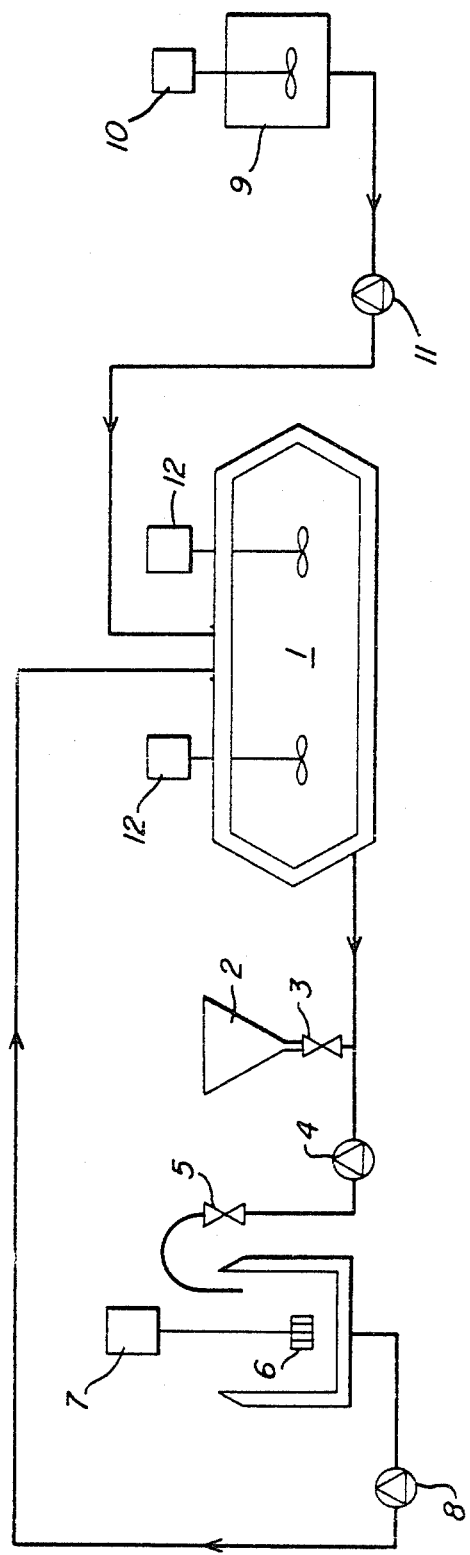
FIG. 1 is a schematic illustration of the process of preparing the nucleotide enriched milk of the present invention.

The process is the following: Lactose (2.66%) is dissolved in water (10%) of low salt content in lactose solution tank 9, by a highe speed stirrer 10. The pH of the solution is adjusted to 7.5 with potassium hydroxide. The pH adjustment to the cited value is a fundamental step in the process since the stability of the final product depends on it, and as a consequence is an important differentiation factor from other humanized milks obtained by other methods.

The solution of lactose is mixed up with cow's milk (34.25%) having 3.2% of fat and 8.20% of non-fat solids, previously diluted with water (48.1%) in which the potassium phosphate (0.48%), the potassium citrate (0.02%), the sodium ascorbate (0.03%) and the mineral complex (0.00001%) had been dissolved.

In said mixture, whey is spread by means of a special device consisting of a funnel 2 connected to a circuit where there is a centrifugal pump 4 of high suction capacity aspirating the liquid mixture. Through a tubular tip 3 placed just below the funnel, a Venturi effect is produced thus allowing the whey to be introduced gradually and mixed up with the lacteous liquid mixture (milk, water, lactose and minerals).

Once the whey has been melted (spread) using the mentioned device, the mixture of vegetable oils (3.52%) is added through the funnel. In this case, a centrifugal pump 4 draws the product into a reservoir 6 provided with a high speed homogenizing-stirrer 7, and so the emulsion of the oils into the rest of the liquid product can take place without adding emulsifiers. This is an essential stage for the preparation of a product without any free fat, which is a fact quite frequent in humanized milks presently on the market.

The liquid base is heated up to 65° C. and homogenized at a pressure of 200 kg/cm²; afterwards, the product is pasteurized at 95°-100° C. and evaporated by a double or triple effect evaporator, with steam recompression until 45-50% of total solids. Nucleotides are immediately added to the product either after pasteurization or after evaporation. This is a fundamental step for obtaining an appropriate product, because if they were added to raw milk a great quantity of nucleotides would be destroyed by the alkaline phosphatase of milk. The evaporated product is dried in a horizontal or vertical spray-drier, using hot air current as dehydrating element. The result is the base of the humanized milk added with nucleotides of the invention.

The nucleotide added powdered base is mixed up with lactose and the vitamin complex both in powder, in the proportions of 73%, 26.9% and 0.1% respectively. The mixture is made instant and it is agglomerated in a conventional horizontal tunnel. After this, the product will be ready for packing.

The process for obtaining the product in liquid form is nearly the one mentioned since the sole variation, as aforementioned, resides in the proportion of solids.

In order to avoid repetitions, the steps for obtaining the product in liquid form can be summarized as follows:

Dissolution of lactose (5.58%) in water (20%) and adjustment of pH at 7.5 with potassium hydroxide.

Preparation of a mixture of cow's milk (30.60%) with water (39.80%), potassium phosphate (0.10%), potassium citrate (0.02%), sodium ascorbate (0.03%), vitamin complex and minerals (0.013%).

Mixture of the lactose and the cow's milk-water-vitamins-minerals dissolutions.

Spreading of demineralized whey (1.10%) in above mixture.

Emulsion of a vegetable oils mixture (2.91%) in the above whey spread one.

Preheating to 65° C. and homogenization at 200 kg/cm² followed by sterilization at 135° C. during 15 seconds and cooling down to 30° C.

Addition of nucleotides at 30° C. to the sterilized product.

Bottling in high density polyethylene bottles and second sterilization at 121° C. in a continuous sterilization tower.

The emulsified product could also be sterilized by UHT (150° C. during 2-4 s.) and then aseptically packed. In this case, nucleotides are added just before sterilization (powdered product) or pre-pasteurized milk is used (liquid product) in order to have the phosphatase inactivated, and then sterilization can take place at any moment after rearrangement and emulsion of the vegetable oils.

For the product in powder form, UHT sterilization can also be used. In this case, after mixing the lactose solution with the mixture of cow's milk, water and mineral salts, and after spreading the demineralized whey and emulsification of vegetable oils, the product is UHT sterilized, the nucleotides are immediately added to said product and the product then evaporated and spray-dried in order to obtain the dry base, which once mixed with lactose and vitamins, is the final product in powder form.

Figure 2:
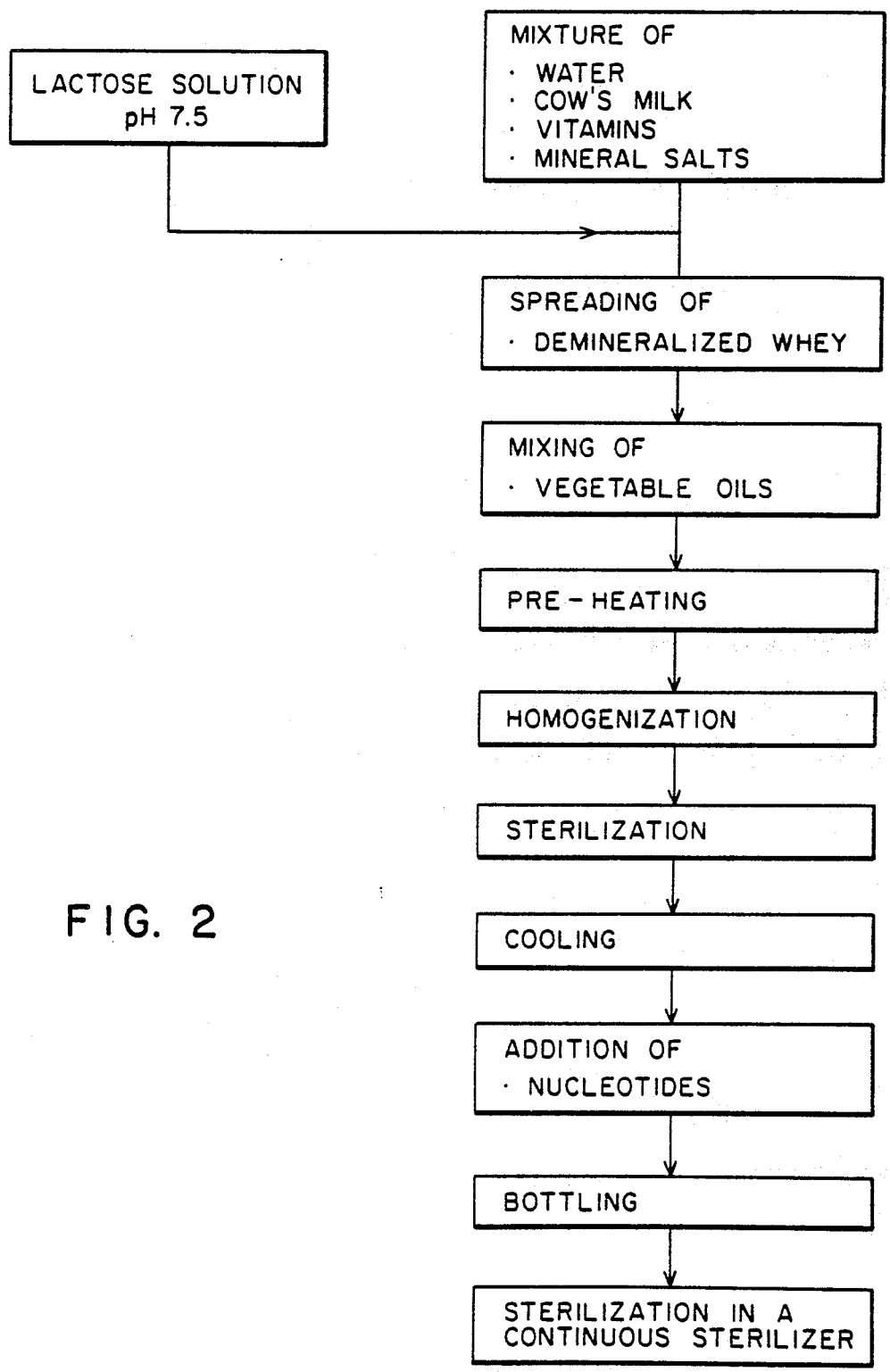
FIG. 2 illustrates the order of the steps of the process of preparing the liquid form of the nucleotide milk of the present invention.
Figure 3:
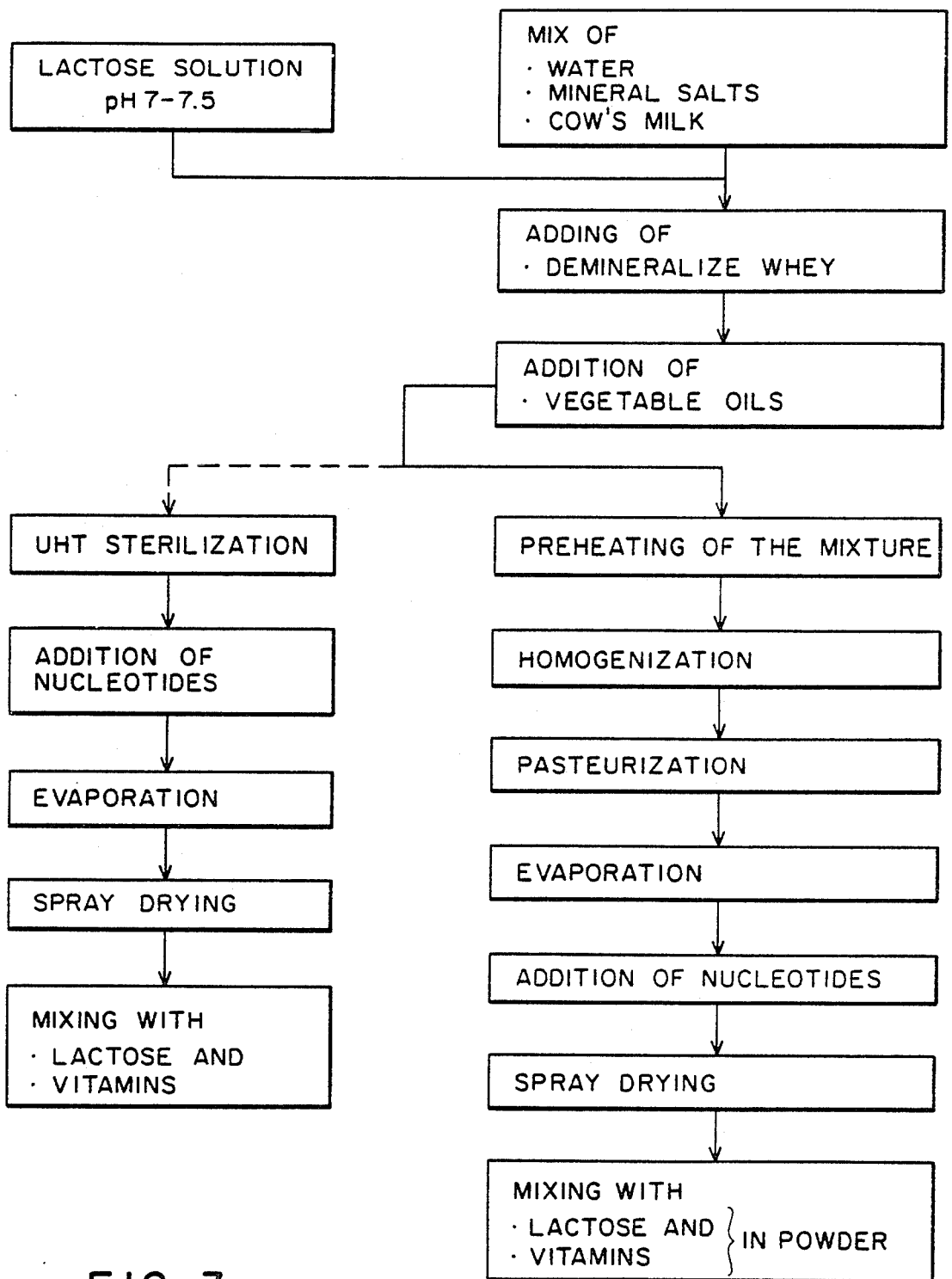
FIG. 3 illustrates the process of preparing the powdered form of the milk of the present invention with UHT sterilization.
Figure 4:
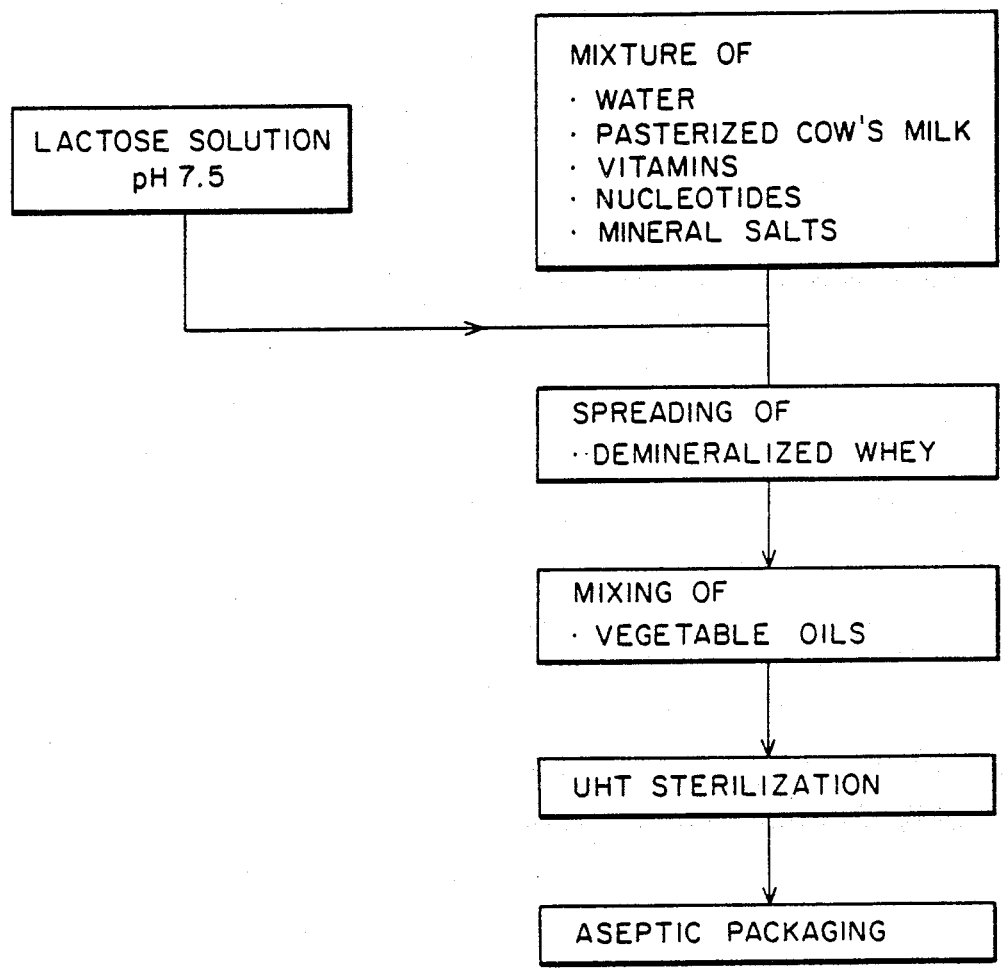
FIG. 4 illustrates the process of preparing the liquid form of the milk of the present invention with UHT sterilization.

FIGS. 2, 3 and 4 are flow charts showing each step of the process of the present invention, illustrating both the liquid and powder form of the milk, as well as the alternative methods of using UHT sterilization.

We claim:

1. Nucleotide enriched humanized milk in powder form which comprises: cow's milk; demineralized whey; vegetable oils; lactose; dipotassium phosphate; tripotassium citrate; sodium ascorbate; vitamins; minerals; and all of the following nucleotides in the precise ratios cited: AMP (adenosine-monophosphate) 1.32 mg/100 g, CMP (cytidine-monophosphate) 1.12 mg/100 g, GMP (guanosine-monophosphate) 1.49 mg/100 g, UMP (uridine-monophosphate) 3.42 mg/100 g and IMP (inosine-monophosphate) 0.45 mg/100 g.

2. Nucleotide enriched humanized milk in liquid form which comprises: cow's milk; demineralized whey; vegetable oils; lactose; dipotassium phosphate; tripotassium citrate; sodium ascorbate; vitamins; minerals; and all of the following nucleotides in the precise ratios cited: AMP (adenosine-monophosphate) 1.7 mg/liter, CMP (cytidine-monophosphate) 1.5 mg/liter, GMP (guanosine-monophosphate) 1.9 mg/liter, UMP (uridine-monophosphate) 4.4 mg/liter and IMP (inosine-monophosphate) 0.6 mg/liter.

3. Nucleotide enriched humanized milk according to claims 1 or 2 which comprises per 100 g of dry product:

| Proteins | 12.2% |
|---|---|
| Lipids | 29.5% |
| [Carbohydrates] Lactose | 53.7% |
| Mineral salts | 2.1% |
| Moisture | 2.5% |
| Caloric content | 530 Kcal [%]; |
| the fatty acid content per 100 g of fat being: | |
| [Butiric] Butyric | 0.6% |
| Caproic | 0.5% |
| [Caprilic] Caprylic | 11.2% |
| Capric | 7.6% |
| Lauric | 1.1% |
| Myristic | 3.0% |
| Palmitic | 19.0% |
| Stearic | 5.6% |
| Palmitoleic | 0.7% |
| Oleic | 24.2% |
| Linolenic | 1.9% |
| Linoleic | 24.0% |
| Arachidonic | 0.6%; | the mineral content of said humanized milk per 100 g of dry product being as follows:

| Ca | 370 mg [%] |
|---|---|
| P | 190 mg [%] |
| Na | 175 mg [%] |
| K | 495 mg [%] |
| Cl | 330 mg [%] |
| Mg | 55 mg [%] |
| Fe | 6 mg [%] |
| Zn | 1.5 mg [%] |
| Cu | 0.3 mg [%] |
| Mn | 0.006 mg [%] |
| I | 0.03 mg [%] | the vitamin content per 100 g of said dry product being as follows:

| A | 1.600 I.U. |
|---|---|
| [P3] D3 | 300 I.U. |
| B1 | 0.40 mg |
| B2 | 0.45 mg |
| B6 | 0.20 mg |
| B12 | 1.1 [ug] μg |
| C | 40 mg |
| E | 5 mg |
| Folic acid | 45 [ug] μg |
| Calcium pantothenate | 5.5 mg |
| Nicotinamide | 6.7 mg |
| [Biotine] Biotin | 15 [ug] μg |
| K1 | 60 [ug] μg; and | the following nucleotides per 100 g of said dry product:

| Adenosine-5'-monophosphate disodium salt (AMP) | 1.32 mg |
|---|---|
| Cytidine-5'-monophosphate disodium salt (CMP) | 1.12 mg |
| Guanosine-5'-monophosphate disodium salt (GMP) | 1.49 mg |
| Uridine-5'-monophosphate disodium salt (UMP) | 3.42 mg |
| Inosine-5'-monophosphate disodium salt (IMP) | 0.45 mg | said nucleotides being added to said dry product in molar ratios of 1:1:1:3:0.5, respectively.

4. A process for the preparation of a nucleotide enriched humanized milk in powder form comprising cow's milk; demineralized whey; vegetable oils; lactose; dipotassium phosphate; tripotassium citrate; sodium ascorbate; vitamins; minerals; and all of the following nucleotides in the precise ratios cited: AMP (adenosine-monophosphate) 1.32 mg/100 g, CMP (cytidine-monophosphate) 1.12 mg/100 g, GMP (guanosine-monophosphate) 1.49 mg/100 g, UMP (uridine-monophosphate) 3.42 mg/100 g and IMP (inosine-monophosphate) 0.45 mg/100 g, said process comprising the steps of:

forming a lactose solution by dissolving lactose in water of low saline content, by means of a high speed stirrer;

adjusting the pH of said solution to about 7.5 with potassium hydroxide;

preparing a mixture of cow's milk, water, and minerals;

mixing said mixture with said lactose solution;

spreading demineralized whey on said lactose solution, and said mixture, said spreading being conducted in a slow and gradual manner;

adding a mixture of vegetable oils to said whey-containing mixture and emulsifying said vegetable oils in said whey-containing mixture;

pre-heating said emulsified mixture containing vegetable oils;

homogenizing under pressure, pasteurizing and evaporating said pre-heated mixture containing vegetable oils;

adding nucleotides to said homogenized, pasteurized and evaporated mixture;

drying said mixture containing nucleotides by means of a spray-drier to obtain a dry base;

mixing said dry base with a further portion of lactose in powder form; and adding vitamins to said mixture of base and lactose to obtain a final dry powder product.

5. A process for the preparation, in powder form, of a nucleotide enriched humanized milk according to claim 4, which further comprises sterilizing said emulsified mixture at ultra high temperatures (UHT), said nucleotides being added immediately after said UHT sterilization step, followed by evaporation, spray drying, and mixing of said dry base with lactose and vitamins.

6. A process for the preparation, in liquid form, of a nucleotide enriched humanized milk comprising cow's milk; demineralized whey; vegetable oils; lactose; dipotassium phosphate; tripotassium citrate; sodium ascorbate; vitamins; minerals, and all of the following nucleotides in the precise ratios cited: AMP (adenosine-monophosphate) 1.7 mg/liter, CMP (cytidine-monophosphate) 1.5 mg/liter, GMP (guanosine-monophosphate) 1.9 mg/liter, UMP (uridine-monophosphate) 4.4 mg/liter and IMP (inosine-monophosphate) 0.6 mg/liter, said process comprising, in the following order, the steps of:

forming a lactose solution by dissolving lactose in water and adjusting the pH with potassium hydroxide;

preparing a mixture of cow's milk, water, vitamins and minerals;

mixing said lactose solution with said cow's milk mixture;

spreading demineralized whey on said lactose solution and said cow's milk mixture;

emulsifying a mixture of vegetable oils into said whey-containing mixture;

pre-heating and homogenizing said emulsified mixture, said homogenizing being followed by a first sterilization and a cooling;

adding nucleotides to said cooled mixture;

bottling said nucleotide containing solution in high density polyethylene bottles; and sterilizing said bottled solution a second time to obtain a final product in liquid form.

7. A process for the preparation, in liquid form, of a nucleotide enriched humanized milk according to claim 6, which further comprises using pre-pasteurized cow's milk in said mixture of water, lactose, vitamins and minerals, followed by said steps of adding said nucleotides to said mixture, spreading said demineralized whey, mixing said vegetable oils, sterilization by UHT and aseptic packaging.

* * * * *